United States Patent
Sandstrom

[19]

[11] Patent Number: 5,852,621
[45] Date of Patent: Dec. 22, 1998

[54] PULSE LASER WITH PULSE ENERGY TRIMMER

[75] Inventor: Richard L. Sandstrom, Encinitas, Calif.

[73] Assignee: Cymer, Inc., San Diego, Calif.

[21] Appl. No.: 897,665

[22] Filed: Jul. 21, 1997

[51] Int. Cl.$^6$ ....................................................... H01S 3/10
[52] U.S. Cl. ................................. 372/25; 356/218; 372/30
[58] Field of Search ................................ 356/218; 372/9, 372/10, 12, 18, 25, 27, 29, 30, 38, 57

[56] References Cited

U.S. PATENT DOCUMENTS

| | | | |
|---|---|---|---|
| 4,447,151 | 5/1984 | McLellan et al. | 356/218 |
| 4,611,270 | 9/1986 | Klauminzer et al. | 372/30 X |
| 4,959,840 | 9/1990 | Akins et al. | 372/57 |
| 5,742,634 | 4/1998 | Rieger et al. | 372/25 |

OTHER PUBLICATIONS

Zucker, O.S.F., McIntyre, I.A., Solone, P.J. and Hargis, D.E., "Photoconductively controlled electro–optic laser modulation", Optics Letters, vol. 18, No. 15, Aug. 1, 1993, pp. 1271–1273.

Zucker, O.S.F., McIntyre, I., Solone, P., Cardwell, K. and Hargis, D., "Photoconductive switch control of optical devices", SPIE, vol. 1873 Optically Activated Switching III (1993), pp. 250–261. [No month].

*Primary Examiner*—John D. Lee
*Attorney, Agent, or Firm*—John R. Ross, Esq.

[57] ABSTRACT

A pulse laser system for providing precise control of laser pulse energy. A fast pulse energy detector having response time in the nanosecond or sub-nanosecond range provides an electrical signal representing pulse energy to a trigger circuit, which integrates the signal and triggers an electro-optic switch when the integrated signal reaches a predetermined level. The operation of the electro-optic switch trims a portion of the pulse energy so that the resulting pulse energy is maintained at a consistent and desired level. In a preferred embodiment, the electro-optic switch includes a Pockels cell and at least one polarizing beam splitter. In this preferred embodiment, an optical delay line provides additional time for the pulse trimming components to operate.

6 Claims, 6 Drawing Sheets

PULSE LASER WITH PULSE ENERGY TRIMMER

This invention relates to pulse lasers and, in particular, pulse lasers with precise pulse energy control.

BACKGROUND OF THE INVENTION

Some pulse laser applications require precise control of pulse energy with a need for essentially zero variation in pulse energy from pulse to pulse. Often this objective is difficult to achieve, especially in gas discharge lasers. For example, the best prior art excimer lasers utilized for integrated circuit lithography provide a pulse-to-pulse stability of a few percent. These variations are due to various factors such as variations in the gain medium and variations in the electrical discharge process. The duration of the laser pulse for a typical excimer laser used for lithography is about 10–20 ns and the pulse frequency is in the range of about 1,000 Hz.

Prior art attempts to achieve pulse-to-pulse energy consistency have involved techniques internal to the laser such as precise control of the electric discharge voltage and adjustments to the voltage during the time period between the voltage. These techniques have been successful in reducing the variation in pulse energy to a few percent. What is needed is a system providing greater reduction in pulse-to-pulse energy variation

SUMMARY OF THE INVENTION

The present invention provides a pulse laser system for providing precise control of laser pulse energy. A fast pulse energy detector having response time in the nanosecond or sub-nanosecond range provides an electrical signal representing pulse energy to a trigger circuit, which integrates the signal and triggers an electro-optic switch when the integrated signal reaches a predetermined level. The operation of the electro-optic switch trims a portion of the pulse energy so that the resulting pulse energy is maintained at a consistent and desired level. In a preferred embodiment, the electro-optic switch includes a Pockels cell and at least one polarizing beam splitter. In this preferred embodiment, an optical delay line provides additional time for the pulse trimming components to operate.

DETAILED DESCRIPTION OF PREFERRED EMBODIMENTS

Preferred embodiments of the present invention can be described by reference to the figures.

Figure 1:
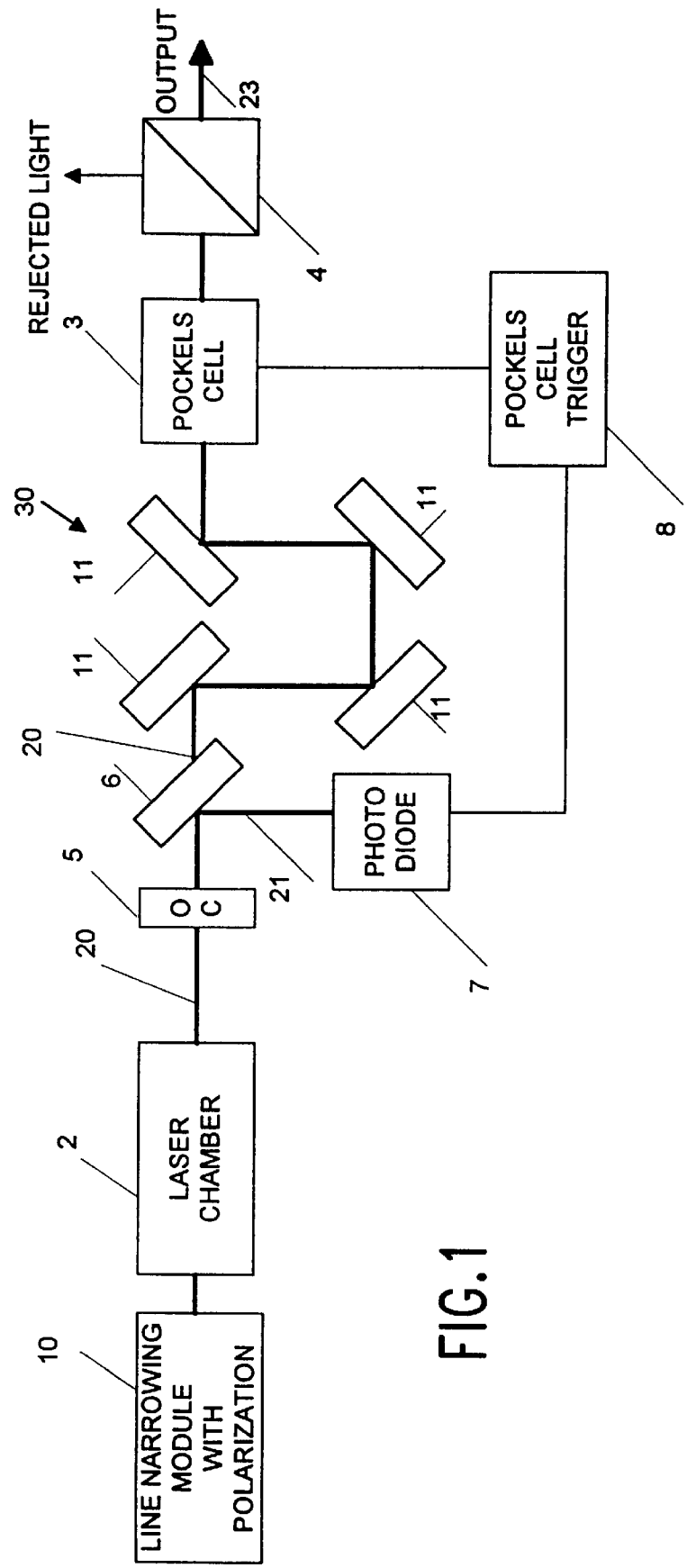
FIG. 1 is a block diagram of a preferred embodiment of the present invention.

A first preferred embodiment of the present invention can be described by reference to FIG. 1. FIG. 1 is a block diagram of an excimer laser having a real time pulse energy trimmer providing a substantial improvement of pulse-to-pulse energy consistency. The system includes an excimer laser chamber containing a pair of elongated electrodes, an excimer laser gas (such as a mixture of Kr, Fl and Ne), a fan to circulate the gas between the electrodes and a heat exchanger. Such a chamber is described in U.S. Pat. No. 4,959,840 issued to Akins et al., which is incorporated herein by reference. Apertures at the windows of the laser cavity produce a beam having a cross section of about 2 mm in the horizontal and 20 mm in the vertical.

A laser resonance cavity is provided by a line narrowing module 10 comprising three prism beam expanders, a pivoting wavelength control mirror, and an echelle grating and output coupler 5, which is a partially reflecting mirror with a reflectivity of about 0.3. The three prism beam expanders of the line narrowing module expand the beam in the horizontal direction to enhance the effectiveness of the grating and to polarize the beam in the horizontal direction.

Beam splitter 6 splits off about 2 percent of the energy of beam 20 and directs the split-off portion 21 to a very high speed photo detector 7.

The main portion 22 of beam 20 proceeds to delay line 30 formed by four 45° full reflectors 11 and passes through Pockels cell 3 and through polarizing beam splitter 4 which is positioned to pass horizontally polarized light and to reject vertically polarized light.

Photo detector 7 should preferably have a very fast rise time such as about 1 ns. One such detector (Item No. FD 5010) is available from Thor Labs, Inc., with offices in Newton, N.J. This unit has a rise time of 1 ns an active area of 1 mm$^2$. The unit comprises a fast PIN photo diode and an internal bias battery.

The output of photo detector 7 is fed to electro-optic cell trigger 8 which integrates the signal and compares the integrated signal to a predetermined cutoff value corresponding to the desired pulse energy. When the cutoff value is reached, trigger 8 produces a trigger signal which activates a high voltage in fast Pockels cell 3. Pockels cell 3 should preferably have a rise time of less than 1 ns, and with repetition rates of up to 5 kHz. One such suitable Pockels cell is available from Energy Compression Corporation with offices in San Diego Calif. This particular Pockels cell has a rise time of 500 ps, with voltages from 3.5 kV to 9 kV and repetition rates as high as 5 kHz with jitter of less than 50 ps. Application of high voltage to Pockels cell 5 shifts the polarization of laser beam 22 by 90 degrees to vertical so that the portion of beam 22 traversing Pockels cell 3 after the switch is rejected by polarizing beam splitter 4.

Thus, the energy of output beam 23 is trimmed to provide pulse-to-pulse consistent energy having a variation of less than 1 percent.

Figure 2A:
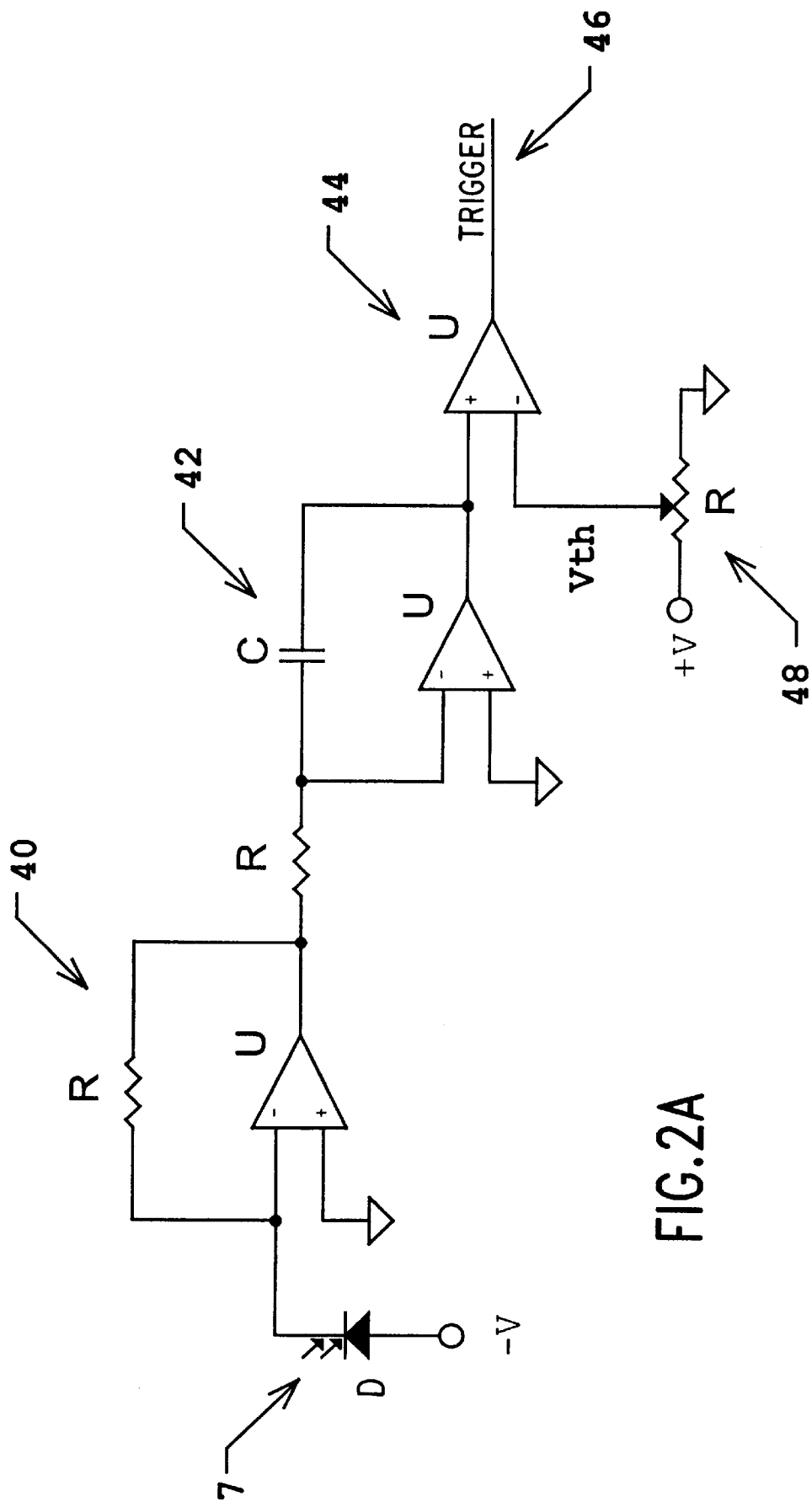
FIGS. 2A and 2B show circuit diagrams of preferred trigger circuits.
Figure 2B:
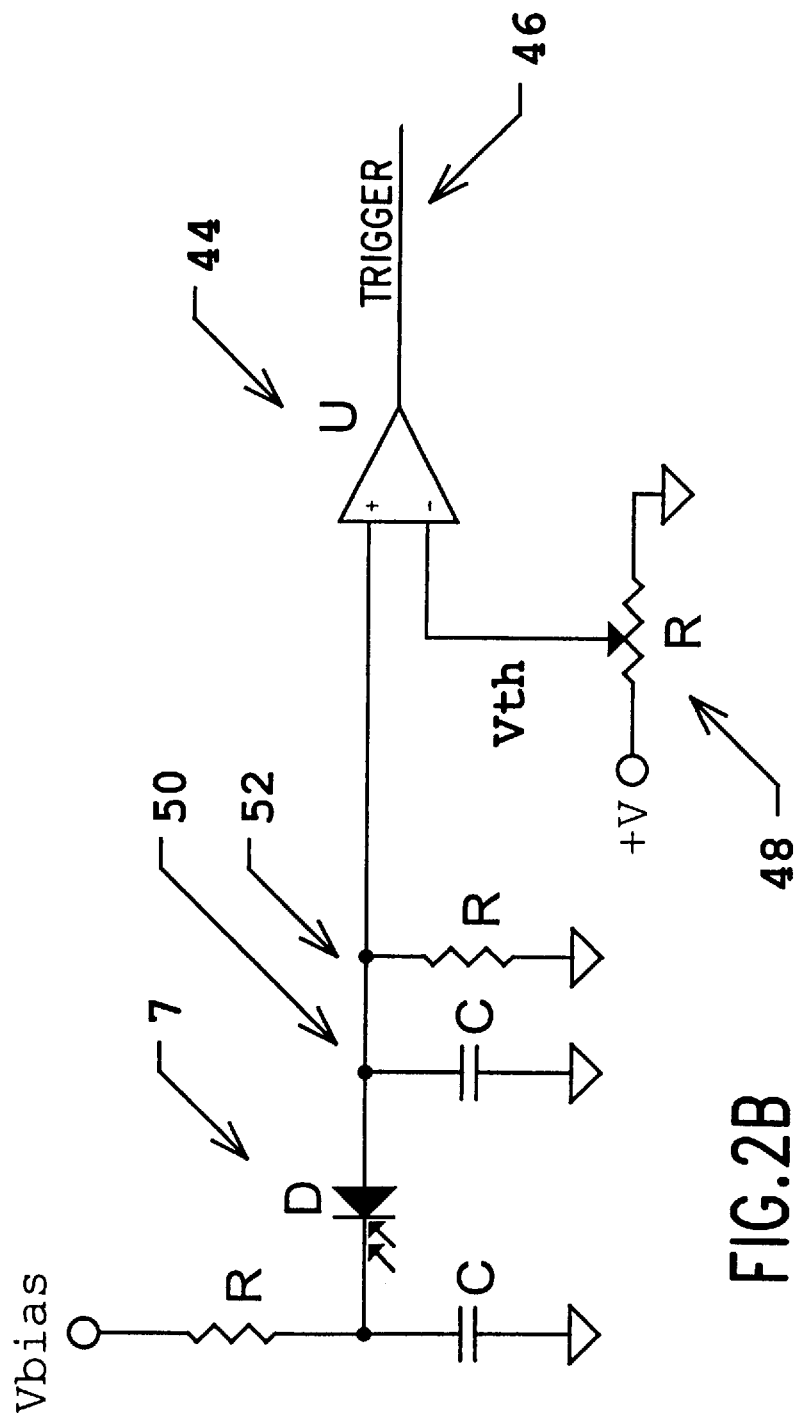

Two preferred circuits for Pockels cell trigger 8 are shown in FIGS. 2A and 2B. In FIG. 2A a current signal from fast photodiode 7 is converted to a voltage signal in current-to-voltage circuit 40, and the voltage signal out of circuit 40 is integrated in integration stage 42. The integrated signal from integration stage 42 is compared to a threshold signal in comparator/trigger stage 44. The output trigger signal 46 swings from rail to rail of the operational amplifier of the comparator/trigger circuit which produces a trigger signal (such as ±13V) for triggering the high voltage of Pockels cell 3 shown in FIGS. 1, 3, 4 and 5. The same amplifier can be used for all three of the circuits. An example of a preferred amplifier is CLC449 or CLC 440. The threshold voltage is adjustable as shown at 48. The adjustment could be manual or it could be made automatically as a part of the feedback circuit. The threshold should preferably be a voltage corresponding to a pulse energy slightly below the lowest pulse energy, typically produced by laser 2 without the trimming features. The delay associated with Pockels cell trigger 8 is estimated to be about 4–5 ns. In the circuit shown in FIG. 2B, the output of photodiode 7 is integrated onto capacitor circuit 50. The capacitor is drained between pulses by the resistor shown at 52. Comparator/trigger stage 44 in the 2B circuit is the same one as in the 2A circuit.

The time required for this system to divert the unwanted portion of the laser pulses in beam 22 is in the range of about 6–7 ns with this embodiment. Therefore, reflectors 11 are positioned to provide a delay of beam 22 of about 6–7 ns. This corresponds to an increase in the beam path length of about 2 meters. In a preferred configuration, the length of the delay route created by mirrors 11 is adjustable. Preferably, the response time of the electronic circuits is measured and the beam path length can be adjusted accordingly. The path length can also be adjusted to tune the system. Alternatively, an adjustable delay circuit could be built into Pockels cell trigger 8 so that an additional calibration element is provided for the pulse trimming system. Both or either of these tuning mechanisms could be automated and incorporated into feedback loops with a pulse energy detector measuring the output pulse energy in order to maintain pulse energy at a desired level.

Other Embodiments

The present invention can be practiced using many other specific configurations. Several of these configurations are described in FIGS. 3 through 5.

Figure 3:
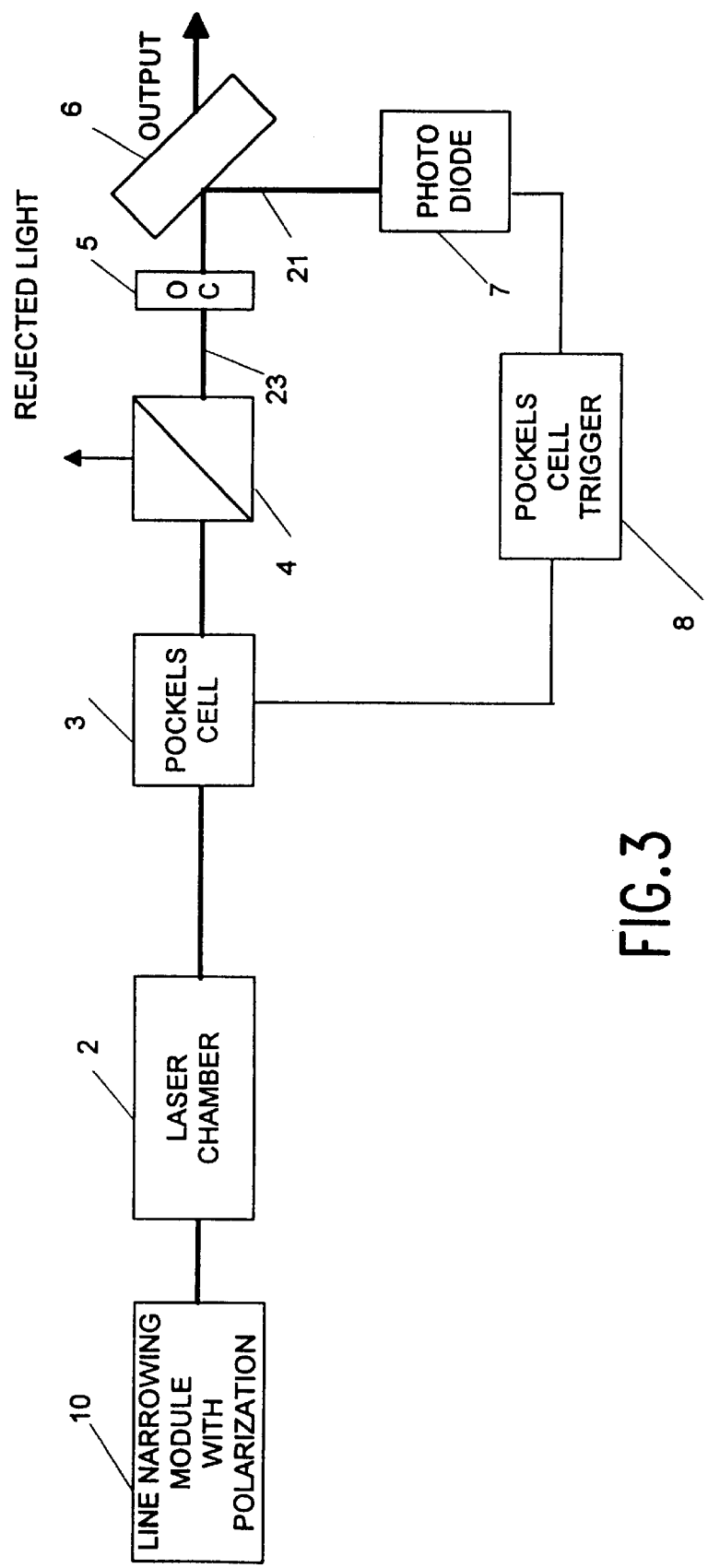
FIGS. 3–5 are block diagrams of other preferred embodiments of the present invention.

In the FIG. 3 arrangement, the Pockels cell is within the resonance cavity and the arrangement contains no optical delay path. This arrangement may be preferred when the pulse is relatively long compared to the action time of the pulse trimming components.

Figure 4:
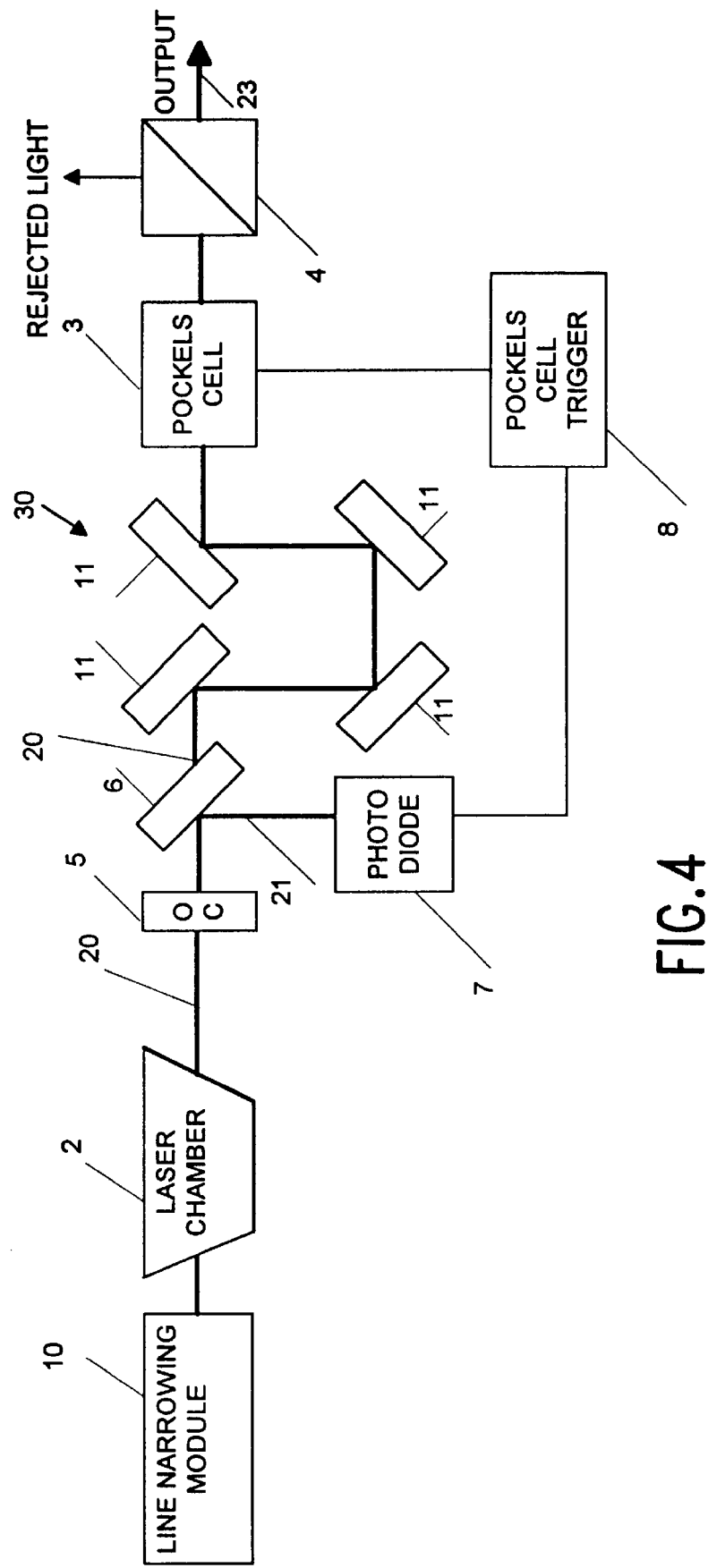

In the FIG. 4 arrangement, a slanted window on the laser chamber provide the initial polarization of the laser beam.

Figure 5:
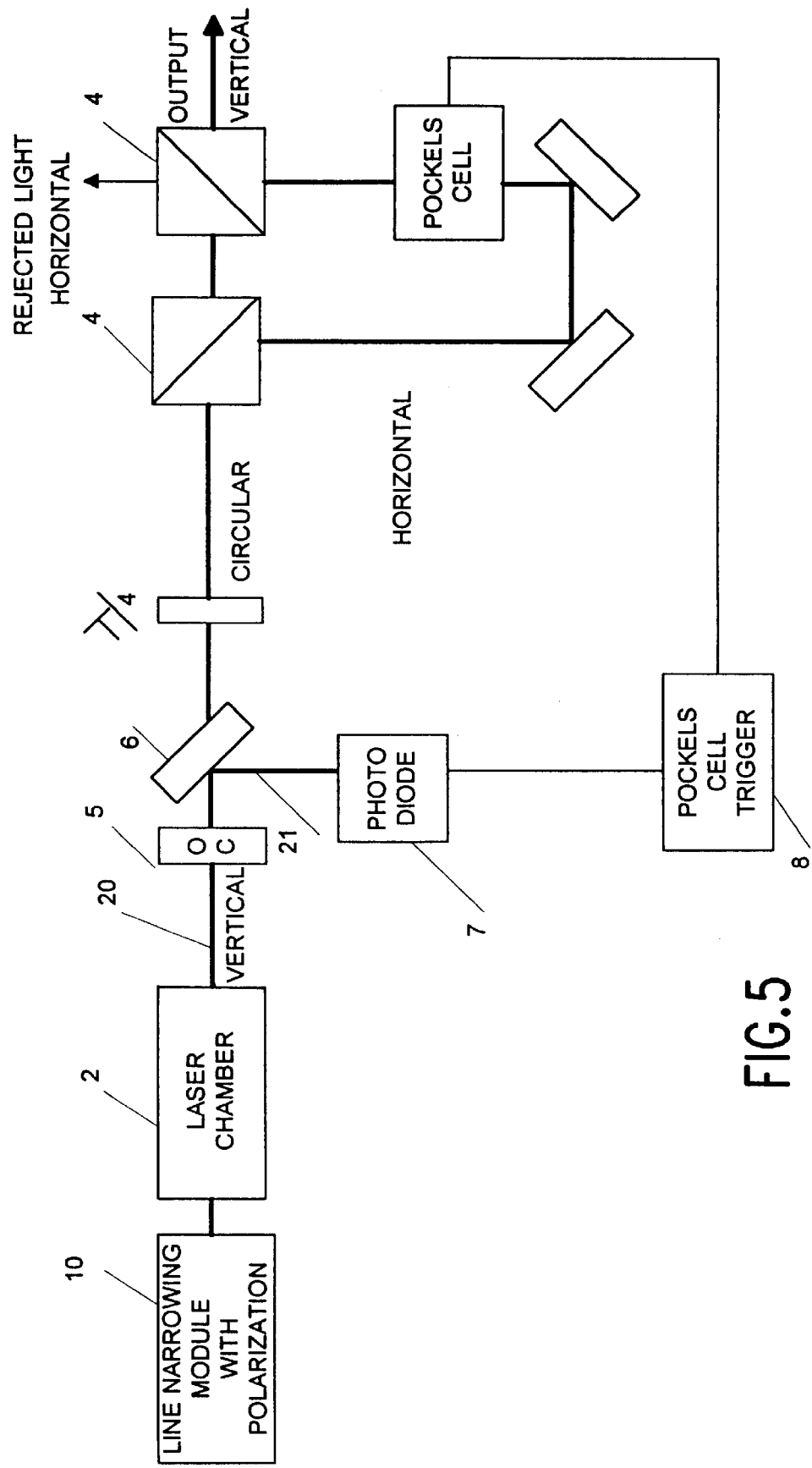

In the FIG. 5 arrangement, some pulse stretching is provided by splitting the laser output beam in half and sending one-half of the beam through an optical delay line. The delayed half is trimmed as needed before being reconnected to the non-delayed half.

Although the laser has been described with reference to several particular embodiments, it is to be appreciated that various adaptations and modifications may be made. For example, controls could be provided for the Pockels cell trigger unit which could provide for time varying pulse energy by changing the trigger threshold as a function of time. Electro-optic trigger 8 could be configured to trigger Pockels cell 3 based on the peak pulse signal from photo-diode 7 instead of the integrated signal. In this case, an appropriate analog circuit would preferably be provided which would trim the tail of the pulse by an amount which is a function of the peak pulse energy. The components of the described systems could be replaced with different, but functionally equivalent components. Therefore, the invention is only to be limited by the appended claims and their legal equivalents.

What is claimed is:

1. A pulse laser system for providing precise control of energy output of each individual pulse in a series of pulses in a pulse laser beam, said system comprising:

A. a pulse laser for producing a pulse laser beam;
  B. a fast pulse detector having response times in the nanosecond or sub-nanosecond range and configured to detect a pre-output pulse energy of each individual pulse in a series of pulses and produce for each said individual pulse in said series of pulses, a signal corresponding to the pre-output pulse energy of said individual pulse, said signal defining a pre-output pulse energy measurement for said individual pulse;
  C. an electro optic switch having response times in the nanosecond or sub-nanosecond range for blocking portions of each pulse in said series of pulses; and
  D. an electro optic switch trigger configured to control said electro optic switch based on said signals from said fast pulse detector, so as to limit the energy output of each individual pulse to approximately a desired energy output based on the pre-output pulse energy measurement of said individual pulse.

2. A pulse laser system as in claim 1 wherein said pulse laser is an excimer laser.

3. A pulse laser system as in claim 1 wherein said fast pulse energy detector is a photo-diode.

4. A pulse laser system as in claim 1 wherein said electro optic switch comprises a Pockels cell and at least one polarizing beam splitter.

5. A pulse laser system as in claim 1 wherein said electro optic switch trigger comprises a trigger circuit arranged to provide high voltage to said Pockels cell when electrical signals from said pulse energy detector reach a predetermined value.

6. A pulse laser system as in claim 1 and further comprising an optical delay line.

* * * * *